Figure 1:
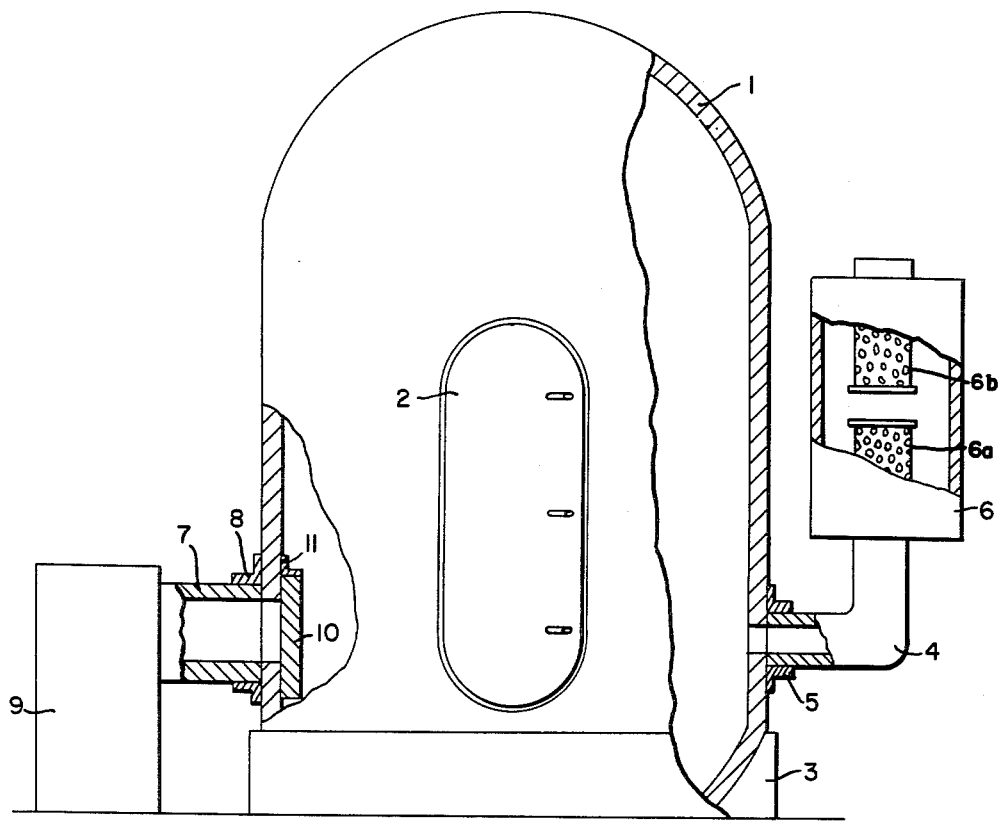

June 14, 1960  F. A. LOVING, JR  2,940,300
SOUND REDUCING EXPLOSIVES TESTING FACILITY
Filed June 7, 1956

INVENTOR
FRANK ABRAHAM LOVING, JR.

BY
ATTORNEY

United States Patent Office 2,940,300
Patented June 14, 1960

2,940,300

SOUND REDUCING EXPLOSIVES TESTING FACILITY

Frank Abraham Loving, Jr., Wenonah, N.J., assignor to E. I. du Pont de Nemours and Company, Wilmington, Del., a corporation of Delaware Filed June 7, 1956, Ser. No. 589,965

3 Claims. (Cl. 73—35)

The present invention relates to a structure for testing explosives. More particularly, this invention relates to a structure for testing explosives wherein the noise produced by detonation of the explosive is reduced to a nonobjectionable level outside the structure.

The detonation of explosives for research and plant control testing has frequently been the cause of complaints by persons living close to the test site. These complaints refer primarily to the objectionable sound heard when the explosive is detonated in the air rather than to any physical damage resulting from the explosion. Consequently, for many years means have been sought to eliminate such complaints without foregoing the necessary testing programs.

The industry has known for many years that airborne sound waves from detonations of explosive can be reduced by confining the explosive so that a substantial portion of the released energy is absorbed by work done on the confining medium. A convenient confining medium is water, and many tests are carried out underwater. However, the seismic wave from underwater detonations may become as objectionable as the sound wave from shots in air. Furthermore, the behavior of explosives is dependent upon the confining medium, so that tests underwater may give inadequate information about explosives to be used in media other than water.

The actual sound level measured at the point of complaint usually is not excessively high. The cause of complaint lies rather in the nature of the sound wave associated with an explosion. This wave is identified primarily by the fact that the first sound pulse reaching the listener is also the pulse of maximum intensity. The resulting sharp crack may be attenuated by reflection and refraction to a rumble, but the listener is nevertheless startled by such a sound even though the actual sound level is no more than that frequently found in home and factory. An object of the present invention is to provide a structure for the testing of explosives. A further object is to provide a means to reduce the sound level from an explosion, and to modify the character of the sound so that it will not be associated with an explosion. An additional objective is to provide a structure which may be reused a great number of times for the testing of explosives. Additional objectives will become apparent as this invention is more fully described.

I have found that the foregoing objects may be attained when I provide a structure for testing explosives which comprises a cylindrical chamber having the ends meeting the sides of the chamber to form a continuous curve, an access opening into the chamber and a hinged, inwardly-opening door attached to said access opening, the walls of said chamber being of such mass and tensile strength as to withstand a hydrostatic pressure which is calculatable in accordance with the equation $P = KW/V$ wherein P is pressure in pounds (square inch), K is a constant dependent upon the strength of the explosive, W is the weight of the explosive in pounds and V is the volume of the chamber in cubic feet. The value of K for PETN is approximately $2 \times 10^4$ and, inasmuch as PETN is representative of the most powerful explosive likely to be tested in the present structure, this value may generally be used. However, if less powerful explosives are to be tested, the value of the most powerful of these should be used. For example, if the strongest explosive to be tested were a 40% ammonia dynamite, this value would be $7 \times 10^3$. The equation will provide a hydrostatic pressure value which can be used in conventional formulas for determining necessary wall dimensions and which will produce deformation in the wall equivalent to that from the dynamic pressures resulting from the detonation of the explosive, this dynamic pressure being a composite of shock wave pressure, expanding gas pressures, pressure piling effects, and pressure reflections stemming from the above. The chamber will also have a vent which will permit release of the gases from the chamber through a muffling means, i.e., through a means which does not present a straight-line path for the gases.

Figure 2:
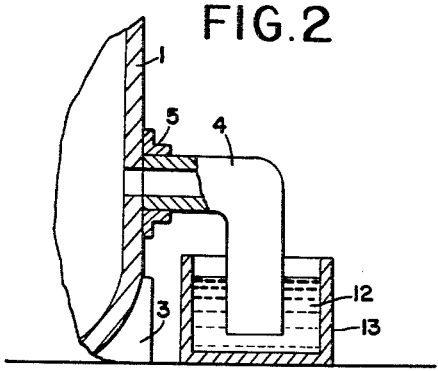

In order to describe fully the structure of the present invention, reference is now made to the accompanying drawings in which Figure 1 is primarily a schematic one of a structure designed in accordance with the present invention, and Figure 2 represents an alternative muffling arrangement. In the drawing, 1 represents the shell, for example of steel, 2 represents an access door, preferably inwardly-opening, 3 represents a supporting base, for example, reinforced concrete, 4 represents a vent tube connected to shell 1 by flange 5 and carrying a gas muffler 6 having internal perforated tubes 6a and 6b to provide a devious path for exhaust gases. 7 represents a fresh air tube fastened to shell 1 by flange 8 and connected to a blower 9. Inside of shell 1 is the air port shutter 10 fastened by hinge 11. Not shown are retaining hooks welded to shell 1 to position explosive charges within the shell, and electrical conduits for ignition circuits and instrument circuits. Additionally, camera ports may be included for photographic studies of explosives in detonation.

In the embodiment shown in Figure 2, the vent tube 4 terminates under the surface of water 12 within container 13.

The shell 1 may be made of a single thickness of steel or may be of a sandwich construction consisting of two sheets of steel and an interposed layer of reinforced concrete. This latter construction possesses the advantage that missile damage is less likely to destroy the utility of the structure since the missile would not be likely to pierce more than the inner steel sheet. In certain circumstances, the structure may be constructed with the longitudinal axis parallel to the ground. In this case, the access door will preferably be located in one of the ends for simplicity of construction.

The requirements for the thickness of the shell are that the walls of the shell be capable of withstanding the deformation produced by the complex pressure pulse developed by the detonation of the explosive charge within the chamber. The shock wave peak pressure produced by such detonation may be greatly in excess of the pressure which will produce permanent deformation of the walls, but our experiments have shown that the shock wave pressure is of such short duration that insufficient distortion of relatively massive chamber walls will occur to cause permanent deformation. It will be understood that the chamber walls will be displaced to some degree by every explosion, but that no permanent damage will result if the deformation does not exceed that limit at which the yield strength of the wall is overcome.

The strength of the wall required is a function of the volume of the chamber, of the type of explosive detonated, and of the weight of explosive detonated. The thickness of the wall required is, of course, dependent on the yield strength of the material used.

We have found that the expression $P=KW/V$ wherein P is an equivalent hydrostatic pressure in pounds per square inch, W is the weight of the explosive charge in pounds, K is an empirical constant, and V is the volume of the chamber in cubic feet, can be used to determine a working pressure which may then be used in standard pressure code formulas to determine the wall strength required. As previously indicated, a value of $2 \times 10^4$ may generally be used for K.

An important element in the design of a structure in accordance with this invention is the avoidance of any sharp corners and flat surfaces within the chamber. Localized stress concentrations are greater with flat surfaces or sharp corners. A spherical structure would possess an ideal configuration with respect to stress, but a cylindrical structure having rounded ends is more adaptable for use as a testing facility.

A critical feature is the provision of a venting means which does not provide a straight-line passage for the gases issuing from the chamber. A number of expedients for absorbing the energy of the gases may be used, such as, for example, having the vent pipe project below the surface of a body of water, exhausting the gases through a bubble cap plate filled with water, introducing a number of curves in the vent pipe, or by connecting a gas-type muffler to the end of the vent pipe. Such means for venting the gases must prevent transmission of the annoying shock wave from the chamber to the surrounding atmosphere. If a straight-line vent is used, or if the baffling is inadequate, the shock wave will be transmitted and the muffling effectiveness of the chamber lost.

The invention has been fully described in the foregoing. I intend, however, to be limited only by the following claims inasmuch as many modifications and variations which are obvious to one skilled in the art are within the scope of this invention.

I claim:

1. A structure for testing explosives which comprises a cylindrical chamber having the ends thereof meeting the sides of the chamber to form a smooth continuous curve, an access opening into the chamber, a hinged, inwardly-opening door attached to said access opening, and means for venting said chamber by providing a passage for the exit of gases from said chamber, said passage deviating from a straight line, said chamber being of such mass and tensile strength as to withstand internal hydrostatic working pressures in accordance with the equation: $P=KW/V$ wherein K is an empirical constant dependent on the strength of the explosive, W is the weight of explosive in pounds, and V is the volume of the chamber in cubic feet.

2. The structure of claim 1, wherein the venting means terminates below the surface of water.

3. The structure of claim 1, wherein the venting means terminates in a gas-type muffler.

References Cited in the file of this patent

UNITED STATES PATENTS

| | | |
|---|---|---|
| 931,189 | Emerson | Aug. 17, 1909 |
| 1,065,707 | Montgomery | June 24, 1913 |
| 1,961,315 | Waseige | June 5, 1934 |
| 2,046,252 | Davis | June 30, 1936 |
| 2,406,942 | Buttner | Sept. 3, 1946 |
| 2,659,235 | Storer | Nov. 12, 1953 |

OTHER REFERENCES

Book—"Explosives," by Marshall, published by Churchill, London, 1915, pages 361, 364.